United States Patent [19]

Salpaka

[11] Patent Number: 5,464,229
[45] Date of Patent: Nov. 7, 1995

[54] QUICK RELEASE CHUCK DEVICE

[75] Inventor: Glenn L. Salpaka, Salem, S.C.

[73] Assignee: Power Tool Holders, Inc., Wilmington, Del.

[21] Appl. No.: 249,535

[22] Filed: May 26, 1994

[51] Int. Cl.⁶ .................... B23B 31/107; B23B 31/14
[52] U.S. Cl. .................... 279/30; 279/75; 279/82; 279/905
[58] Field of Search .................... 279/22, 24, 28–30, 279/75, 82, 904, 905, 131, 903; 403/325, DIG. 6; 408/238, 239 R, 239 A; 409/182, 233; 192/45

[56] References Cited

U.S. PATENT DOCUMENTS

| 31,755 | 12/1861 | Wanner et al. . | |
| 93,108 | 7/1869 | Miller . | |
| 913,059 | 2/1909 | Savage . | |
| 914,255 | 3/1909 | Farnham . | |
| 1,043,114 | 11/1912 | Kupke . | |
| 1,353,299 | 9/1920 | Wilson | 279/75 |
| 1,509,061 | 9/1924 | Hardwicke . | |
| 1,602,708 | 10/1926 | Russell . | |
| 1,642,490 | 9/1927 | Decker . | |
| 2,172,070 | 9/1939 | Palmgren . | |
| 2,413,422 | 12/1946 | Teige et al. . | |
| 2,472,392 | 6/1949 | Alexander . | |
| 2,613,941 | 10/1952 | Gridley . | |
| 2,615,721 | 10/1952 | Gridley . | |
| 2,619,357 | 11/1952 | Montgomery . | |
| 2,736,562 | 2/1956 | Blackburn . | |
| 2,767,992 | 10/1956 | Emrick . | |
| 2,807,473 | 9/1957 | Kiehne . | |
| 2,926,020 | 2/1960 | Dayton et al. . | |
| 2,987,334 | 6/1961 | Wendling . | |
| 3,184,020 | 5/1965 | Benson et al. | 192/45 |
| 3,251,605 | 5/1966 | Ondeck . | |
| 3,255,792 | 6/1966 | Beck . | |
| 3,367,727 | 2/1968 | Ward et al. . | |
| 3,436,086 | 4/1969 | Glenzer . | |
| 3,462,164 | 8/1969 | Wightman . | |
| 3,489,191 | 1/1970 | Blevins | 408/239 R |
| 3,521,895 | 7/1970 | Smith | 279/22 |
| 3,583,715 | 6/1971 | Jahrl . | |
| 3,599,996 | 8/1971 | Holt . | |
| 3,652,099 | 3/1972 | Bilz . | |
| 3,735,993 | 5/1973 | Seibert . | |
| 3,811,361 | 5/1974 | Seely et al. | 409/182 |
| 3,851,890 | 12/1974 | Smith | 279/75 |
| 3,893,677 | 7/1975 | Smith . | |
| 3,945,653 | 3/1976 | Falchle . | |
| 3,945,751 | 3/1976 | Johnson . | |

(List continued on next page.)

FOREIGN PATENT DOCUMENTS 29908 of 1913 United Kingdom .................... 279/30

Primary Examiner—Steven C. Bishop
Attorney, Agent, or Firm—Dority & Manning

[57] ABSTRACT

A quick-change chuck device has a body member having an internal recess defined therein. An inner sleeve member is fitted into this recess and is axially movable relative to the body member. The inner sleeve has an internal bore defined therethrough which is concentric with the recess. An axial spring mechanism biases the inner sleeve member axially away from the body member. An axial movement locking device is configured with the inner sleeve member to allow a tool shank to slide into the internal bore of the inner sleeve when the sleeve is moved axially towards the body member and to axially lock the tool shank within the internal bore when the inner sleeve member is biased by the spring mechanism away from the body member. A rotational movement locking device is configured within the recess of the body member. The rotational movement locking device defines a bore aligned with the internal bore of the inner sleeve member for receiving the tool shank passing through the inner sleeve member. The rotational movement locking device comprises a plurality of spring loaded longitudinal bearing members disposed about the bore and extending radially into the bore. In this manner, the bearing members contact the tool shank. The bearing members are spring loaded tangentially inward so as to rotationally lock the tool shank against rotation in at least one rotational direction.

23 Claims, 4 Drawing Sheets

U.S. PATENT DOCUMENTS

| | | |
|---|---|---|
| 3,947,047 | 3/1976 | Hultman . |
| 4,002,348 | 1/1977 | Johnson . |
| 4,032,163 | 6/1977 | Holt . |
| 4,041,729 | 8/1977 | Bilz . |
| 4,067,424 | 1/1978 | Johnson . |
| 4,184,692 | 1/1980 | Benson et al. . |
| 4,202,557 | 5/1980 | Haussmann et al. . |
| 4,209,182 | 6/1980 | Sheldon . |
| 4,234,277 | 11/1980 | Benson et al. . |
| 4,252,333 | 2/1981 | Vogel . |
| 4,275,893 | 6/1981 | Bilanceri . |
| 4,290,617 | 9/1981 | Yoshida . |
| 4,305,597 | 12/1981 | McCarty . |
| 4,395,051 | 7/1983 | Tonomura . |
| 4,434,859 | 3/1984 | Rumpp et al. . |
| 4,547,105 | 10/1985 | Hofle et al. . |
| 4,577,875 | 3/1986 | Miyakawa . |
| 4,588,335 | 5/1986 | Pearson, Jr. . |
| 4,599,019 | 7/1986 | Ueberall . |
| 4,604,010 | 8/1986 | Reeves .................... 409/233 |
| 4,692,073 | 9/1987 | Martindell . |
| 4,900,202 | 2/1990 | Wienhold . |
| 5,009,440 | 4/1991 | Manschitz . |
| 5,011,344 | 4/1991 | Johnson . |
| 5,013,194 | 5/1991 | Wienhold . |
| 5,096,212 | 3/1992 | Walsh ...................... 279/83 |
| 5,301,961 | 4/1994 | Wozar . |
| 5,354,075 | 10/1994 | Marik et al. . |

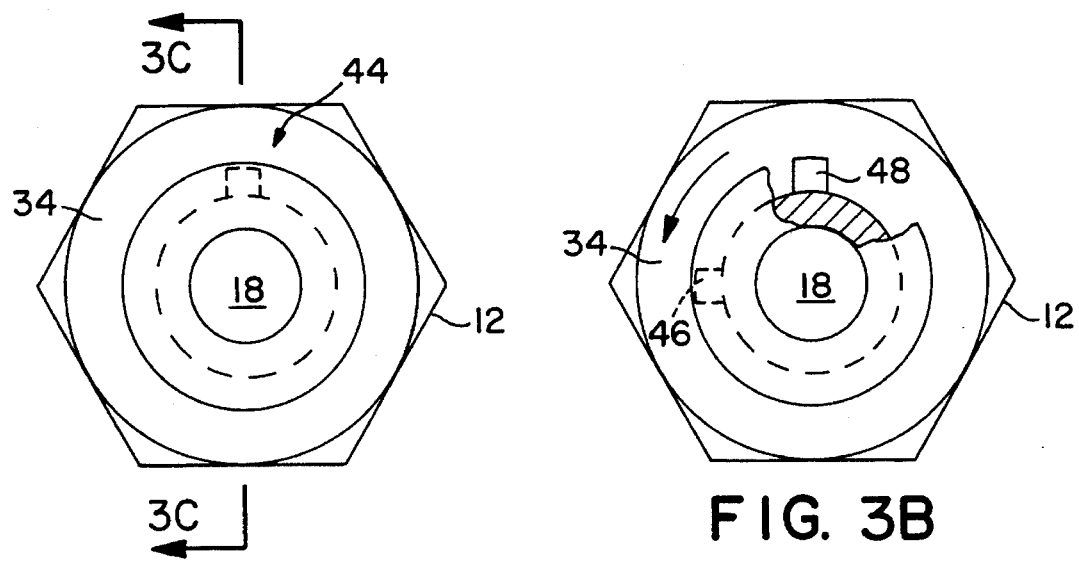
FIG. 3A
FIG. 3B
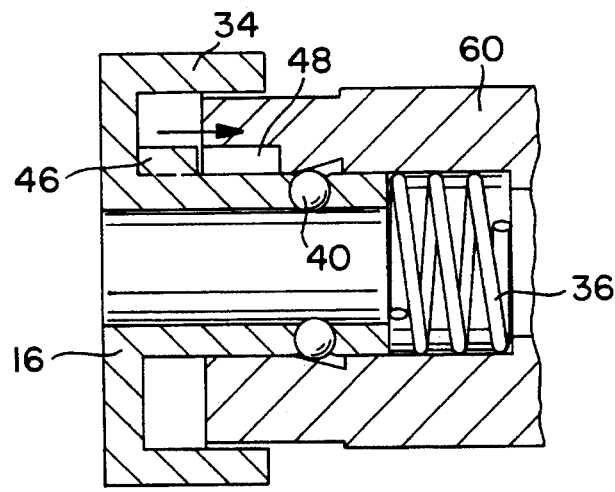
FIG. 3C

QUICK RELEASE CHUCK DEVICE

BACKGROUND OF THE INVENTION

The present invention relates to a quick release chuck utilized for holding power bits or tools to a machine tool, and more particularly to a quick release chuck which is configurable with a drive spindle and which contains locking mechanisms for locking a tool shank radially and axially.

Various devices are known in the art for use on portable stationary routers, laminate trimmers, dry wall cutters, etc. for securing or holding power tools or power bits to the spindle of the machine tool. For example, various collet tool holding devices and quick release adapters are known in the art. For example, U.S. Pat. No. 5,301,961 to Wozar describes such a chuck. Likewise, U.S. Pat. No. 4,692,073 to Martindell describes a chuck apparatus for power bits utilizing a spring biased sleeve disposed about the drive spindle for axially securing the power bit to the chuck apparatus.

Any collet or chuck device utilized for holding a power bit, for example a router bit, to a drive spindle must lock the power bit both axially and radially with respect to the drive spindle. In other words, the power bit cannot rotate relative to the drive spindle nor be moved axially in and out relative thereto. This concern is especially important with high speed machine tools both for accuracy considerations and safety. With conventional systems, one relatively simple means for rotationally securing the tool bit consist of defining a hexagonal or other multi-sided profile on the end of the tool bit which fits into a corresponding multi-sided recess formed in the chuck device. In another solution, collet chucks utilize a compressible collet for axially and rotationally holding the tool bit. Collet chucks are useful in that they do not depend on a multi-sided configuration in the tool bit for holding the tool. Thus, any manner of power bits or tool bits having essentially round shank portions may be held by a collet chuck device. However, collet chuck devices do not have the quick-change or quick-release capabilities that are desired in many applications. For example, it is highly desirable for portable tools such as routers or laminate trimmers to utilize quick release chuck devices for relatively quick and easy changeout of tool bits. However, with the conventional quick release devices, the tool shank portions must be multi-sided to fit within corresponding bores defined in the quick-change chuck devices. It would be desirable in the art to have a quick change chuck device which can be utilized with any manner of tool bit, including tool bits that have essentially round tool shanks, for increasing the versatility of such quick change chuck devices.

OBJECTS AND SUMMARY OF THE INVENTION

It is therefore a principal object of the present invention to provide a quick change chuck device for securing a tool bit or working device to the driven spindle of a machine tool wherein the shank portion of the tool bit need not be multi-sided.

A further object of the invention is to provide a versatile quick change chuck device which is capable of holding tool bits having round tool shanks.

And yet a further object of the present invention is to provide a fast acting quick change chuck device in which a tool bit can be readily inserted and removed without having to align a multi-sided profile of the tool with a multi-sided bore in the device.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purposes of the invention, a quick change device is provided comprising a body member which has a recess defined therein. An inner sleeve member is fitted into the recess and is axially movable relative to the body member. The inner sleeve member has an internal bore defined therethrough which is essentially concentric with the recess defined in the body member. An axial spring mechanism is disposed relative to the sleeve member and the body member so as to bias the sleeve member axially away from the body member. An axial movement locking device is configured within the sleeve member. This locking device is configured to allow a tool shank to be slid into the internal bore of the sleeve member when the sleeve member is moved axially towards the body member and to axially lock the tool shank within the bore when the inner sleeve member is released and biased by the spring mechanism away from the body member. This locking device is an axial movement locking device in that it prevents the tool from being axially moved relative to the chuck device. A rotational movement locking device is configured within the recess of the body member. This rotational movement locking device prevents rotation between the tool shank and the device. This locking member defines a bore which is aligned with the internal bore of the inner sleeve for receiving the tool shank passing through the internal bore of the inner sleeve. The rotational movement locking device comprises a plurality of spring loaded longitudinal bearing members disposed about the bore. These longitudinal bearing members extend radially inward into the bore so as to contact the tool shank. The bearing members are spring loaded in a tangential radially inward direction so as to rotationally lock the tool shank against rotation in at least one rotational direction.

In a preferred embodiment of the invention, the inner sleeve member comprises a flanged bushing member which is axially movable relative to the body member by being pressed on the flanged end. In an alternative embodiment, the inner sleeve member further comprises an outer sleeve section which is concentric about the body member. In this embodiment, the inner sleeve member is axially movable relative to the body member by an operator pulling back on the outer sleeve section.

It is also preferred that a locking mechanism be disposed between the inner sleeve member and the body member so as to prevent undesired axial movement between the inner sleeve member and the body member during operation of the device. This locking mechanism may comprise, for example, a key and recess locking system wherein a key member is defined on the inner sleeve member and a corresponding recess is defined in the body member. The inner sleeve member is rotatable relative to the body member so as to align the key member with the recess in order to press the sleeve member against the spring mechanism so as to release the tool shank.

In a preferred embodiment of the invention, the axial movement locking device comprises a ball-lock mechanism which includes a plurality of ball bearings biased radially inward along a slanted surface by the axial spring mechanism. The ball bearings may be carried by an inner sleeve member with the slanted surface being defined in the body member.

In a still further preferred embodiment of the invention, the rotational movement locking device comprises a bearing sleeve which includes a plurality of one-way needle bearings. This bearing sleeve may be press fitted into the internal recess of the body member. In an alternative embodiment, the rotational movement locking device may be axially configured with the inner sleeve member itself so as to be axially movable therewith relative to the body member. In this embodiment, the rotational movement locking device may be formed integral with the inner sleeve member. In an alternative embodiment, the rotational movement locking device may be formed integral with the body member.

The present invention also comprises means for the chuck device to be attached or otherwise configured with a drive spindle of a machine tool. In one preferred embodiment, the body member comprises a female threaded receiving portion at an end thereof opposite the inner sleeve member for threaded engagement with a male threaded driving spindle. Alternatively, the body member may comprise a male threaded engaging portion at the end thereof for threaded engagement with a female threaded receiving portion of a drive spindle. In yet an alternative embodiment, the quick change device may be formed directly on the driving spindle. In other words, the body member may actually comprise or be formed integral with the driving spindle. Alternatively, the device may be configured as a quick release insert device which is insertable into a receiving socket of the driving spindle. This insert device may be held within a receiving socket of a drive spindle with, for example, a threaded draw bar which engages with the device through the spindle.

BRIEF DESCRIPTION OF THE DRAWINGS

FIGS. 3a through 3c are perspective views particularly illustrating the locking mechanism according to the invention;

DETAILED DESCRIPTION OF THE PREFERRED EMBODIMENTS

Figure 1:
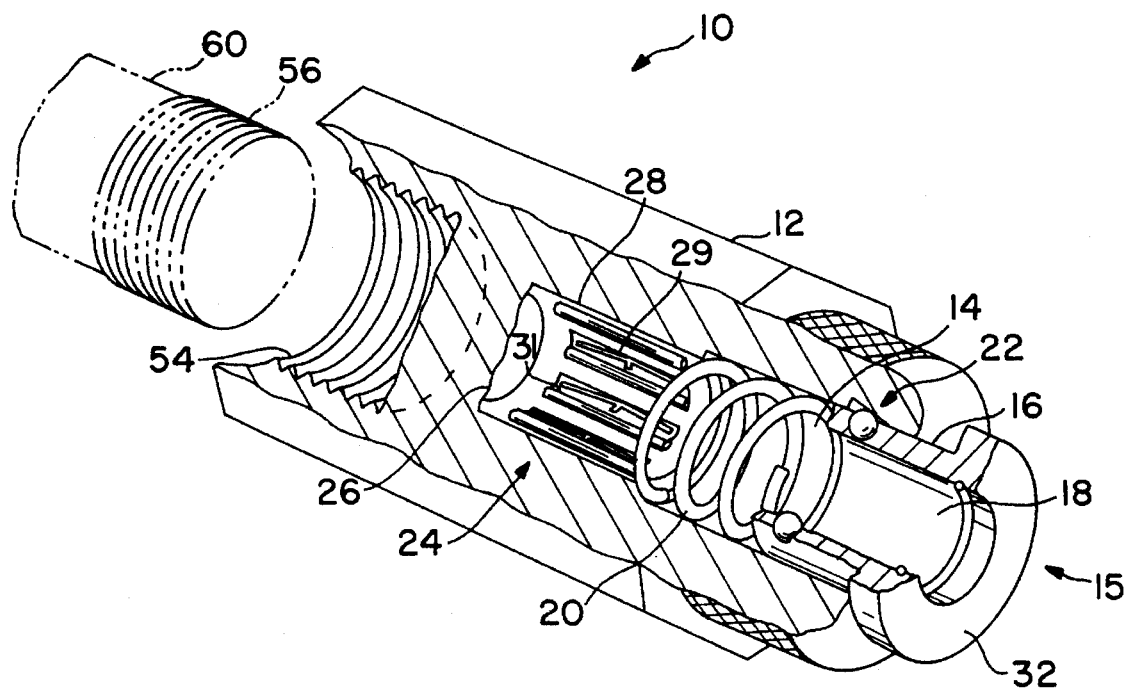
FIG. 1 is a perspective partial cut-away view of the present invention.

Reference will now be made in detail to the presently preferred embodiments of the invention, one or more examples of which are illustrated in the accompanying drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. The number of components in the drawings is consistent throughout the application, with the same components having the same number in each of the drawings.

Figure 2:
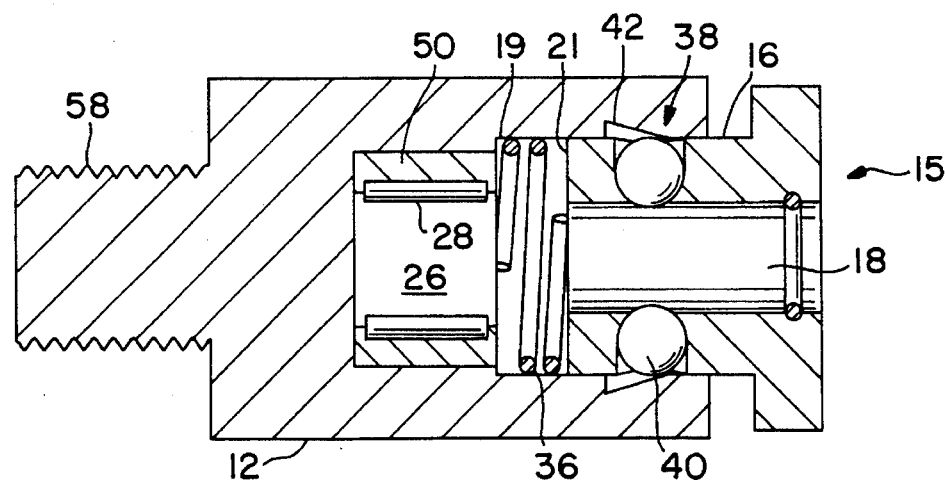
FIG. 2 is a cut-away side view of the invention.
Figure 4:
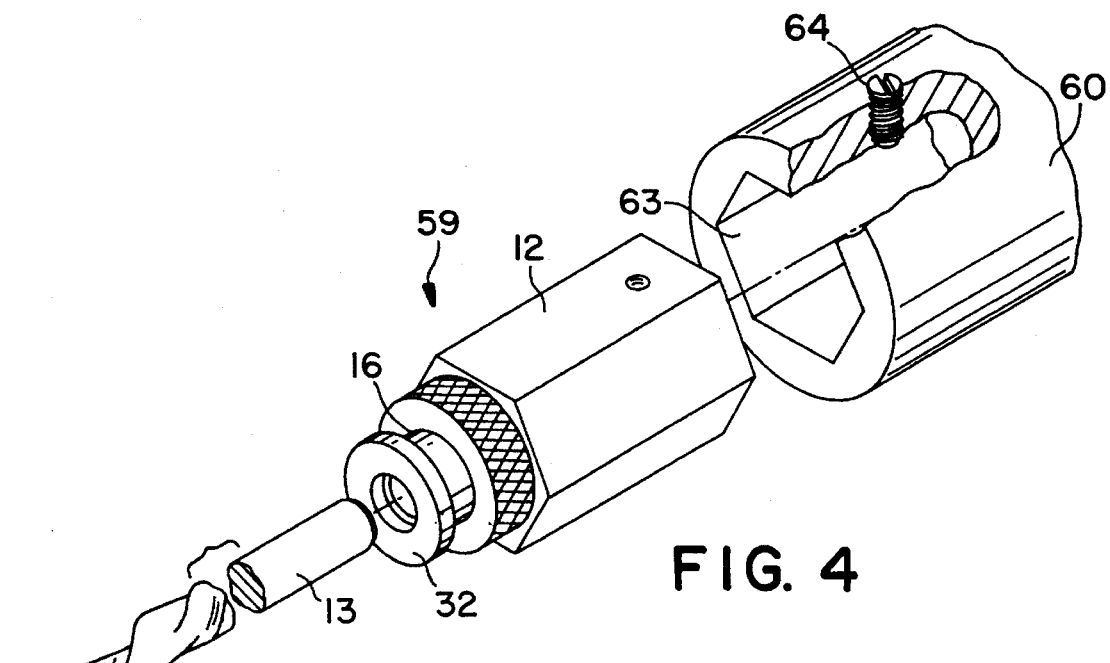
FIG. 4 is a perspective component view of the invention particularly illustrating the invention with a drive spindle.
Figure 5:
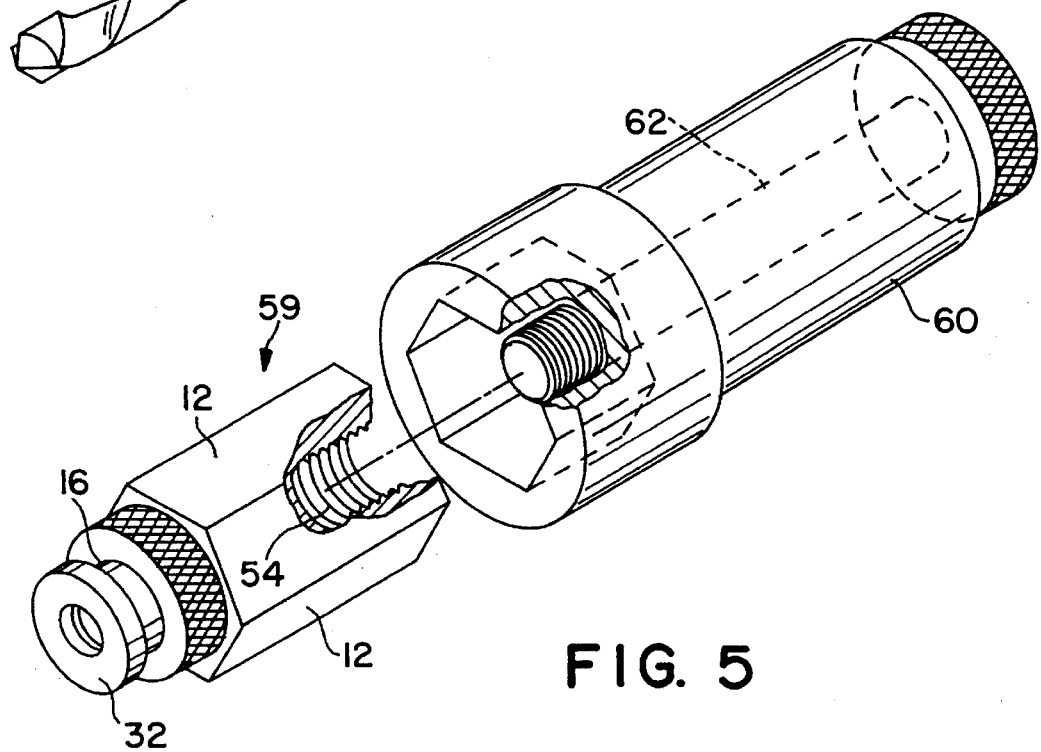
FIG. 5 is a partial cut-away perspective view of the invention with a drive spindle.

In accordance with the present invention, referring particularly to FIGS. 1 and 2, a quick change chuck device 10 is provided. Device 10 includes a body member 12. Body member 12 is configured to be driven by a drive spindle 60, particularly shown in FIGS. 4 and 5. Accordingly, various configurations may be utilized to drive device 10 with spindle 60. For example, body member 12 may comprise a female threaded receiving section 54 defined in the end thereof for engagement with a male threaded portion 56 of the drive spindle, particularly shown in FIG. 1. Alternatively, body member 12 may comprise a male threaded portion 58 for engagement with a female threaded receiving portion configured in the drive spindle 60. In yet an alternative preferred embodiment, device 10 may be configured as a quick release insert device 59 which is insertable into a receiving socket 63 of drive spindle 60. Device 10 may be held in drive spindle 60 by any conventional means, such as a set screw 64 as shown in FIG. 4. Alternatively, the device 10 may be held in the spindle by means of conventional ball detent devices (not shown) or any other suitable retaining devices.

In yet an alternative embodiment of the invention depicted in FIG. 3c, base body 12 may actually be defined in the drive spindle itself. In other words, the end of the drive spindle 60 would simultaneously comprise base body 12.

Device 10 also includes an inner sleeve member 16 which fits into recess 14 of body member 12. Inner sleeve member 16 is axially movable relative to body member 12 in that it can be moved longitudinally within recess 14. Inner sleeve member 16 also includes an internal bore 18 defined therethrough. Bore 18 is essentially concentric with recess 14.

An axial spring mechanism 20 is disposed between the inner sleeve member 16 and body member 12 so as to bias the inner sleeve member axially away from body member 12. In a preferred embodiment, mechanism 20 includes a conventional spring 36. However, spring mechanism 20 can include any conventional biasing member, such as a spring washer, etc. In a preferred embodiment, spring 36 rests against shoulder 19 defined in body member 12. The other end of spring 36 presses against the rear face 21 of inner sleeve member 16. In this manner, spring 36 biases inner sleeve member 16 axially away from body member 12.

An axial movement locking device 22 is configured within inner sleeve member 16. Locking device 22 allows a tool shank to be slid into internal bore 18 of inner sleeve member 16 when the inner sleeve member is moved axially towards body member 12. Locking device 22 then axially locks the tool shank within internal bore 18 when inner sleeve member 16 is biased by spring mechanism 20 away from body member 12. In a preferred embodiment, axial movement locking device 22 comprises a ball-lock mechanism 38. Mechanism 38 includes a plurality of ball bearings 40 which are biased radially inward along slanted surfaces 42 by spring mechanism 20. Ball bearings 40 extend radially into internal bore 18 when they are at the end position of slanted surfaces 42. In this manner, a tool shank 13 inserted into internal bore 18 would be held within bore 18 against axial movement by ball bearings 40 being pressed radially inward onto shank 13. Any action tending to draw tool shank 13 out of bore 18 would only cause bearings 40 to be forced further down slanted surfaces 42 thereby axially locking shank 13 even tighter. Tool shank 13 is released upon inner sleeve member 16 being longitudinally displaced towards body member 12. When this happens, ball bearings 40 are free to slide up slanted surfaces 42 thereby releasing tool shank 13. In a preferred embodiment of the invention, ball bearings 40 are carried by inner sleeve member 16 and slanted surfaces 42 are defined in body member 12, as shown in FIGS. 1 and 2. In an alternative embodiment not shown in the figures, the arrangement of slanted surfaces 42 and ball bearings 40 could be reversed. In other words, the slanted surfaces may be defined in the inner sleeve member 16 with the balls 40 being carried by body member 12.

Device 10 further includes a rotational movement locking device 24 which is configured within recess 14 of body member 12. Rotational movement locking device 24 defines a bore 26 therein which is aligned with internal bore 18 of inner sleeve member 16 for receiving tool shank passing through internal bore 18. This arrangement is particularly seen in FIGS. 1 and 2. Rotational movement locking device 24 comprises a plurality of spring-loaded longitudinal bearing members 28 disposed about bore 26. Bearing members 28 are spring loaded in that they extend radially into bore 26 so as to contact the tool shank 13 which is fitted into bore 26 along their length. The bearing members 28 are spring loaded in a tangentially inward direction by means of, for example, a spring or spring bar 29. In this manner, the longitudinally disposed bearing members 28 will give or flex when the tool shank is rotated in one direction against the biasing effects of spring member 29. However, when the tool shank is rotated in the opposite direction, bearing members 28 are caused to contact and press against tool shank 13 to prevent rotational movement in that direction. Longitudinal bearing members 28 are directed tangentially inward by way of a slanted surface 31 cooperating with spring device 29. Accordingly, the greater the rotational torque applied to a tool shank held within bore 26 in a direction corresponding to the spring effect of springs 29, the tighter the tool shank is held against rotation within bore 26. However, when the tool is rotated in the opposite direction, longitudinal bearing members 28 are free to slide up slanted surfaces 31 against spring member 29 permitting rotational movement of the tool in that direction.

In a preferred embodiment of the invention, longitudinal bearing members 28 comprise individual roller bearings 52. Preferably, the individual roller bearings are held within a bearing sleeve 50. Preferably, bearing sleeve 50 is press fitted into internal recess 26. Applicant has found that a preferred arrangement of the rotational movement locking device is a Torrington type one-way clutch bearing. The Torrington bearings can be purchased in various sizes depending on the diameter of the tool shank to be held.

It should be understood that the roller bearing arrangement preferably utilized in the invention, such as that sold by Torrington, is but a mere example of an acceptable rotational movement locking device which may be utilized with the invention. For example, the longitudinal bearing members 28 may be seated directly within body member 12. Additionally, the longitudinal bearing members may be biased by means other than a spring arm 29. Alternatively, longitudinal bearing members 28 may come in a variety of size, or may comprise individual bearings disposed end to end. Additionally, the rotational movement locking device may be configured so that rotation of the shank is not permitted in either direction. With the one-way roller bearings, rotation of the shank is permitted in one direction. However, the roller bearings may be tangentially biased in both rotational directions so that the tool shank cannot rotate in either direction.

Also, it should be understood that it is not a requirement of the invention that the rotational movement locking device be axially stationary relative to body member 12. In an embodiment not shown in the figures, the rotational movement locking device may be configured with the inner sleeve member so as to be axially movable therewith. The locking effect of the rotational movement locking device does not depend on the biasing force of spring mechanism 20. In this embodiment, the rotational movement locking device may be formed integral with inner sleeve member 16. In an alternative embodiment, the rotational member locking device may be formed integral with body member 12. In this embodiment, the rotational movement locking device would not move axially with inner sleeve member 16. Any and all such embodiments and configurations are within the scope and spirit of the invention.

Preferably, inner sleeve member 16 of the device comprises a bushing member having a flanged end 32. The bushing member is axially movable relative to body 12 by an operator pressing on flanged end 32. In an alternative embodiment particularly shown in FIG. 3c, inner sleeve member 16 may comprise an outer sleeve section 34 which is essentially concentric about body member 12. In this embodiment, the inner sleeve member 16 is axially moved relative to body member 12 by an operator pulling back on the outer sleeve section. Preferably, the surface of the outer sleeve section may contain a grip-enhancing knurled surface 35.

Device 10 according to the invention also preferably includes a locking mechanism 44 which is operably disposed between inner sleeve member 16 and body member 12. This locking member prevents undesired axial movement between the inner sleeve and the body member during operation of the device. Since axial movement of inner sleeve member 16 would unlock tool shank 13 and allow for the tool to be withdrawn, it is desired to lock inner sleeve member in position axially with respect to body member 12 when the device is in operation. For this reason, locking mechanism 44 is provided to axially lock the inner sleeve with respect to the body member. In a preferred embodiment, locking mechanism 44 includes a key and recess locking system. This configuration is particularly shown in FIGS. 3a, 3b, and 3c. A key member 46 is defined on inner sleeve 16. Key 46 fits into a recess 48 defined in body member 12 when it is desired to axially move inner sleeve member 16. Once the tool shank has been inserted, sleeve member 16 is rotated so that the key 46 is no longer aligned with recess 48, as particularly shown in FIG. 3b. In this manner, inner sleeve member 16 can no longer be axially pushed towards body member 12.

It should be understood that any manner of locking mechanism may be provided for locking mechanism 44. There are countless configurations of locking devices which would prevent axial movement between sleeve 16 and body member 12, including set screws, ball detents, etc. Any and all such arrangements are within the scope and spirit of the invention.

Figure 6A:
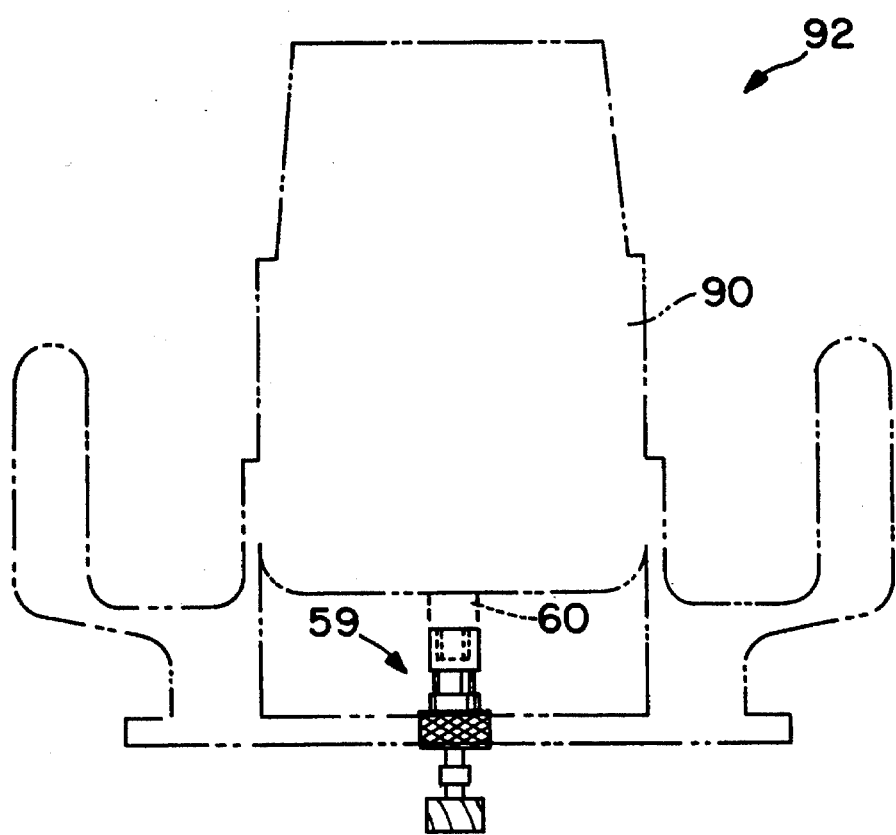
FIG. 6a shows the invention configured as a quick insert device matable with the drive spindle of a router.
Figure 6B:
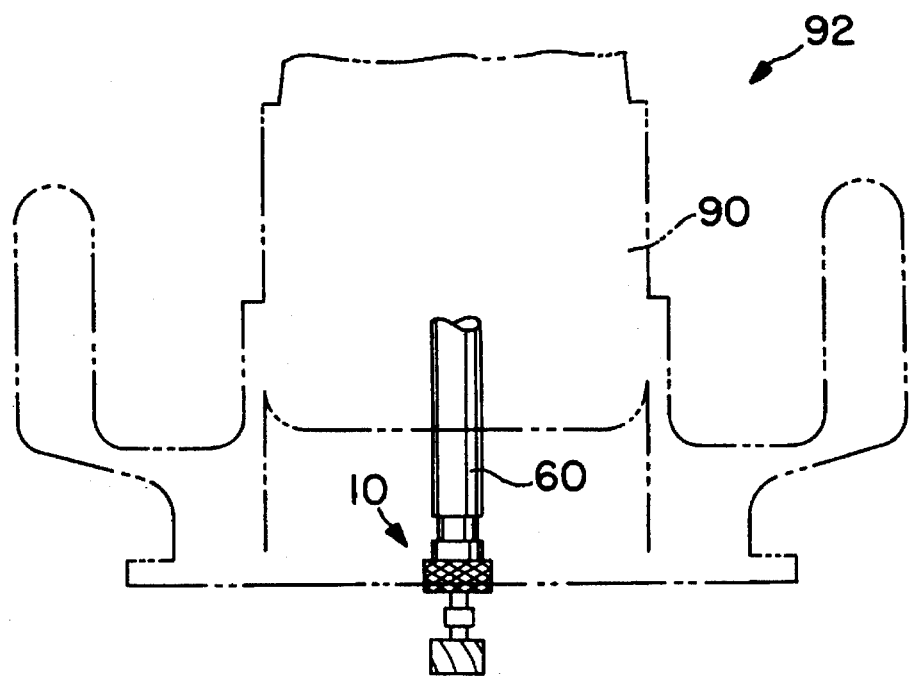
FIG. 6b shows the invention formed integral with the drive spindle of a router.

The present invention is suited for any manner of machine tool 92 wherein a tool bit must be rotationally driven. The device is particularly suited for a machine router 90, as shown in FIGS. 6a and 6b. However, this is in no means a limitation of the invention. In fact, it will be apparent to those skilled in the art that various modifications and variations can be made in the apparatus of the present invention without departing from the scope or spirit of the invention. Thus, it is intended that the present invention cover the modifications and variations of this invention provided they come within the scope of the appended claims and their equivalents.

What is claimed is:

1. A quick-change chuck device, comprising:

a body member having an internal recess defined therein;

an inner sleeve member fitted into said recess and axially moveable relative said body member, said inner sleeve having an internal bore defined therethrough essentially concentric with said recess said inner sleeve member further comprising an outer sleeve section which is concentric about said body member, said inner sleeve member being axially moyable relative to said body member by pulling back on said outer sleeve section;

an axial spring mechanism disposed relative to said inner sleeve member and said body member so as to bias said inner sleeve member axially away from said body member;

an axial movement locking device configured within said inner sleeve member, said locking device configured to allow a tool shank to be slid into said internal bore when said inner sleeve member is moved axially towards said body member and to axially lock said tool shank within said internal bore when said inner sleeve member is biased by said spring mechanism away from said body member; and a rotational movement locking device configured within said internal recess of said body member, said rotational movement locking device defining a bore aligned with said internal bore of said inner sleeve member for receiving said tool shank passing through said internal bore, said rotational movement locking device comprising a plurality of spring loaded longitudinal bearing members disposed about said bore and extending radially into said bore so as to contact said tool shank, said bearing members being spring loaded inward so as to rotationally lock said tool shank against rotation in at least one rotational direction.

2. The device as in claim 1, wherein said inner sleeve member comprises a bushing member having a flanged end, said bushing member being axially movable relative said body member by pressing on said flanged end.

3. The device as in claim 1, wherein said axial spring mechanism comprises a spring disposed between an end face of said inner sleeve member and a shoulder defined in said body member.

4. The device as in claim 1, wherein said axial movement locking device comprises a ball-lock mechanism which includes a plurality of ball bearings biased radially inward along slanted surfaces by said axial spring mechanism.

5. The device as in claim 4, wherein said ball bearings are carried by said inner sleeve member and said slanted surface are defined in said body member.

6. The device as in claim 1, further comprising a locking mechanism operably disposed between said inner sleeve member and said body member so as to prevent undesired axial movement between said inner sleeve member and said body member during operation of said device.

7. The device as in claim 6, wherein said locking mechanism comprises a key and recess locking system.

8. The device as in claim 7, further comprising a key member defined on said inner sleeve member and a corresponding recess defined in said body member, said inner sleeve member being rotatable relative to said body member so as to align said key member with said recess.

9. The device as in claim 1, wherein said rotational movement locking device comprises a bearing sleeve which includes a plurality of roller bearings, said roller bearings being spring loaded tangentially and radially inward along inclined surfaces.

10. The device as in claim 9, wherein said bearing sleeve is press fitted into said internal recess of said body member.

11. The device as in claim 1, wherein said rotational movement locking device is formed integral with said body member.

12. The device as in claim 1, wherein said body member comprises a female threaded receiving portion at an end thereof opposite said inner sleeve member for threaded engagement with a male threaded driving spindle.

13. The device as in claim 1, wherein body member comprises a male threaded engaging portion at an end thereof opposite said inner sleeve member for threaded engagement with a female threaded receiving portion of a driving spindle.

14. The device as in claim 1, wherein said device is configured on a driving spindle.

15. The device as in claim 14, wherein said device is formed integral with said driving spindle.

16. The device as in claim 14, wherein said device is configured as a quick release insert device insertable into a receiving socket of said driving spindle.

17. The device as in claim 14, wherein said device is configured as an insert device insertable into a receiving socket of said driving spindle, said device held in said receiving socket by way of a threaded draw bar engaging with said device.

18. The device as in claim 1, wherein said device is configured as a router chuck.

19. A machine tool configured for driving a tool bit, said machine tool comprising:

a drivable spindle;

a quick release chuck operably configured at one end of said spindle for carrying said tool bit, said quick release chuck further comprising:

a body member having an internal recess defined therein;

an inner sleeve member fitted into said recess and axially moveable relative to said body member, said inner sleeve having an internal bore defined therethrough essentially coaxial with said internal recess, said inner sleeve member further comprising an outer sleeve section concentric about said body member;

an axial spring mechanism disposed relative to said inner sleeve member and said body member so as to bias said inner sleeve member axially away from said body member;

an axial movement locking device configured within said inner sleeve member, said locking device configured to allow a tool shank to be slid into said internal bore when said inner sleeve member is moved axially towards said body member and to axially lock said tool shank within said internal bore when said inner sleeve member is biased by said spring mechanism away from said body member; and a rotational movement locking device configured within said internal recess of said body member, said rotational movement locking device defining a bore aligned with said internal bore of said inner sleeve for receiving said tool shank passing through said internal bore, said rotational movement locking device comprising a plurality of spring loaded longitudinal bearing members disposed about said bore and extending into said bore so as to contact said tool shank, said bearing members being spring loaded tangentially and radially inward so as to rotationally lock said tool shank against rotation in at least one rotational direction.

20. The machine tool as in claim 19, wherein said machine tool comprises a router.

21. The machine tool as in claim 19, wherein said quick release chuck is threadedly engaged with said spindle.

22. The machine tool as in claim 19, wherein said quick release chuck is releasably fitted into a socket of said spindle.

23. The machine tool as in claim 19, wherein said quick release chuck is formed integral with said spindle.

* * * * *